UNITED STATES PATENT OFFICE.

RUDOLF LESSER, OF BERLIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PROCESS OF DYEING WITH BENZOQUINONE DERIVATIVES.

1,009,981.     Specification of Letters Patent.    Patented Nov. 28, 1911.

No Drawing.    Application filed February 4, 1911. Serial No. 606,611.

*To all whom it may concern:*

Be it known that I, RUDOLF LESSER, Ph. D., chemist, a citizen of the Empire of Germany, residing at Berlin, W., Germany, have invented certain new and useful Improvements in the Process of Dyeing with Benzoquinone Derivatives, of which the following is a specification.

My invention relates to a process of dyeing in the vat with certain benzoquinone derivatives. Some of these products are already known, but their dyeing properties have not been ascertained. The dyestuffs which I found to be suitable for vat dyeing are derived from benzoquinone; they are quinonediarylids which are produced in known manner by heating aromatic amins with benzoquinone, its homologues or halogen derivatives, in an indifferent solvent, such as alcohol, glacial acetic acid or nitrobenzene, with or without addition of a neutralizing agent or catalytic agent.

The constitution of the new products is as follows:

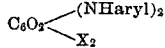

wherein "X" means hydrogen, an alkyl, or a halogen.

The dyeing process consists in reducing the quinonediarylids in an alkaline solution, then dyeing or printing the fiber with the leuco compound thus produced and developing the color by exposure to the air or by an oxydizing agent.

The method of dyeing may be illustrated by the following example: For dyeing with the quinonedianilid, $C_6H_2O_2(NHC_6H_5)_2$ (Beilstein 3rd. edition, Vol. 3 page 340) 1 kg. of the said dyestuff is stirred with about 500–1000 liters of water and there are then added 10–20 liters of caustic soda lye of 30 Bé. specific gravity and 20–30 liters of sodium hydrosulfite of 10° Bé. specific gravity. On gently heating and stirring the mass, the dyestuff dissolves and forms an almost colorless vat which yields on cotton or wool, after exposure to air, yellowish tints. A dyestuff which yields by the same procedure brown tints is, for instance, the product obtainable from chloranil and α-aminoanthraquinone by heating them in presence of nitrobenzene with addition of copper as a catalytic agent.

Other benzoquinone derivatives dyeing in the vat yellow tints are, for instance, the chlorodianilidoquinone obtainable from anilin and trichloroquinone (see Beilstein 3rd edition Vol. III page 340); the chloranildianilid obtainable from chloranil and anilin (see Beilstein 3rd edition Vol. III page 343); and also the dyestuff

produced from chloranil and para-anisidin, which forms fine reddish-colored needles of a metallic luster.

Having now described my invention, what I claim is:

1. The process of dyeing in the vat with benzoquinone derivatives in which two hydrogen atoms have been replaced by aromatic-amin residues, which process consists in reducing the dyestuff in an alkaline solution to leuco compounds, coloring the fiber with these leuco compounds, and developing the color in the usual manner.

2. The process of dyeing in the vat with benzoquinone derivatives in which two hydrogen atoms have been replaced by aromatic-amin residues and other hydrogen atoms have been replaced by non-aromatic bodies as specified, which process consists in reducing the dyestuff in an alkaline solution to leuco compounds, coloring the fiber with these leuco compounds, and developing the color in the usual manner.

In testimony whereof, I affix my signature in presence of two witnesses.

RUDOLF LESSER.

Witnesses:
  HENRY HASPER,
  WOLDEMAR HAUPT.